United States Patent [19]

Verdier

[11] 4,076,066
[45] Feb. 28, 1978

[54] PNEUMATIC TIRE

[75] Inventor: Henri Verdier, Beauregard-l'Eveque, France

[73] Assignee: Compagnie Generale des Etablissements Michelin, Clermont-Ferrand, France

[21] Appl. No.: 600,125

[22] Filed: Jul. 29, 1975

[30] Foreign Application Priority Data
Aug. 5, 1974   France .................................. 74 27217

[51] Int. Cl.² .......................... B60C 9/02; B60C 9/18; B60C 15/00
[52] U.S. Cl. ........................... 152/354 R; 152/353 R; 152/362 R; 152/361 FP
[58] Field of Search ............. 152/354, 361 FP, 362 R, 152/353 R

[56] References Cited
U.S. PATENT DOCUMENTS

| 3,280,877 | 10/1966 | Hanus | 152/354 |
| 3,736,974 | 6/1973 | Lejeune | 152/362 R |
| 3,757,844 | 9/1973 | Verdier | 152/361 FP |
| 3,842,882 | 10/1974 | Gough | 152/354 |
| 3,910,336 | 10/1975 | Boileau | 152/354 |
| 3,949,800 | 4/1976 | Lejeune | 152/362 R |

Primary Examiner—Drayton E. Hoffman
Attorney, Agent, or Firm—Brumbaugh, Graves, Donohue & Raymond

[57] ABSTRACT

In a pneumatic tire wherein the aspect ratio is at most 0.6, the carcass reinforcement, seen in meridian section, follows its natural equilibrium profile between the zone of contact of the side walls with the tread reinforcement and the zone of contact of the side walls with the respective bead rings. The profile is tangent to the bead rings, and the bead rings themselves have a reinforced torsional rigidity.

5 Claims, 1 Drawing Figure

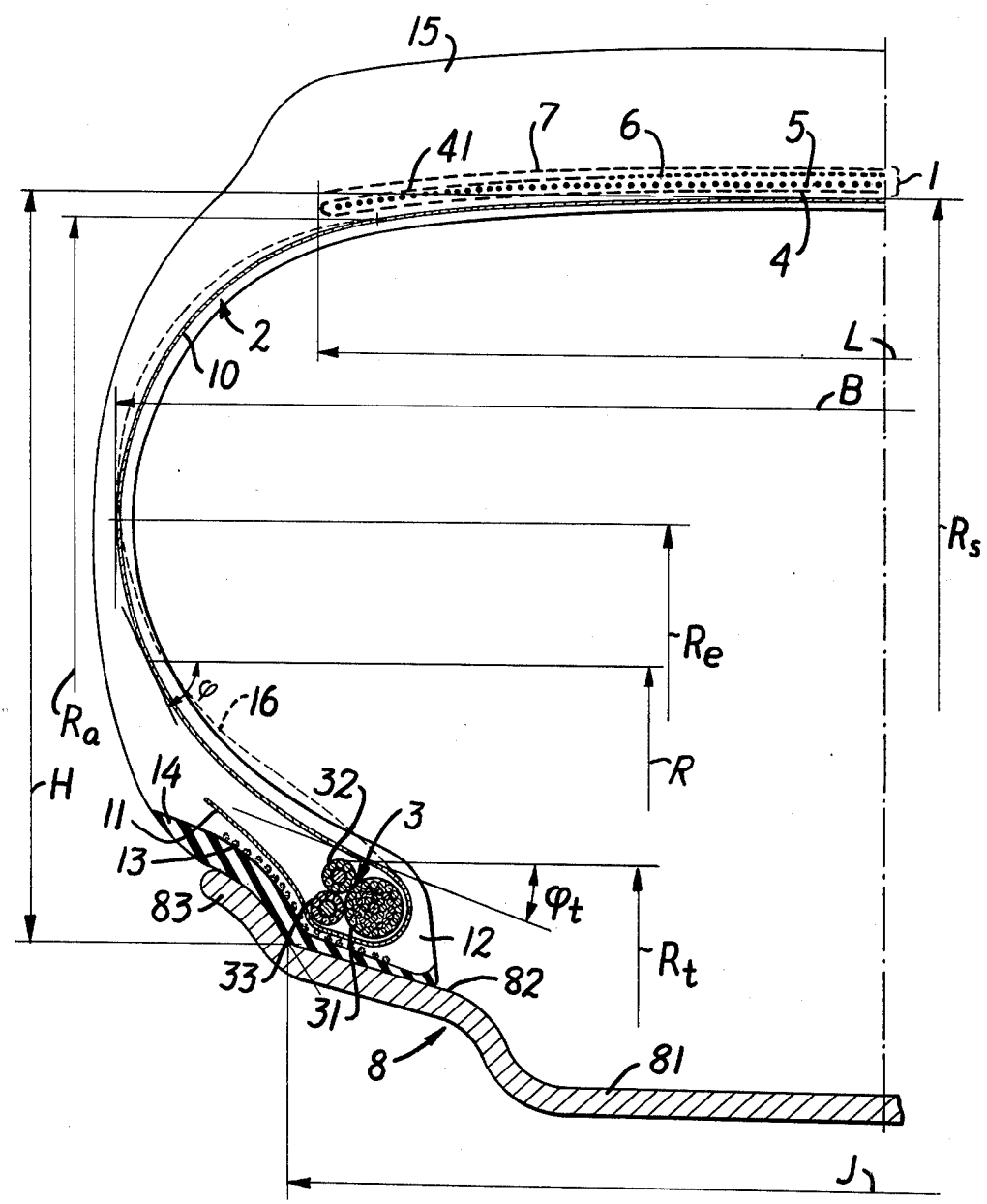

PNEUMATIC TIRE

BACKGROUND OF THE INVENTION

This invention relates to pneumatic tires and, more particularly, to a novel and highly-effective pneumatic tire, with or without a separate inner tube, which has a carcass reinforcement formed of radial cords or cables.

In general, a radial carcass reinforcement is used in combination with a tread reinforcement formed of at least two plies of cords or cables which are parallel in each ply and crossed from one ply to the next. The primary function of the tread reinforcement is to stiffen the tread parallel to the area of contact with the ground. For this reason the cords or cables of the tread plies form small angles with the longitudinal direction of the tire. Such an arrangement of the tread plies tends to impose a circumference close to that of the tread reinforcement in the longitudinal direction of the tire. Furthermore, in the side walls, the carcass reinforcement assumes a more convex profile than it would in the absence of a tread reinforcement. This can be seen by comparing, at the same inflation pressure, the equilibrium profile of a radial carcass belted by a tread reinforcement and the equilibrium profile assumed by the same carcass without a tread reinforcement. The side walls of the latter are less convex, but the tread shows at the same time increased curvature in radial planes of the tire and therefore an increased circumference in the longitudinal direction of the tire. Such an equilibrium profile of a carcass without a tread reinforcement, referred to as the natural or free equilibrium profile, can be represented by the equation $$\cos \phi = (R^2 - R_e^2)/(R_s^2 - R_e^2) \qquad (1)$$

In this equation $\phi$ is the angle formed by (1) the tangent to the equilibrium profile and (2) the axis of rotation of the tire, the tangent point being at a radius $R$ from said axis; $R_e$ is the radius of the equilibrium profile corresponding to the maximum axial width reached in the side walls by this profile; and $R_s$ is the radius of the point of the tread farthest from the axis of rotation located on the axis of symmetry, that is to say in the equatorial plane of the carcass.

It is only recently, in U.S. Pat. No. 3,757,844 to Henri Verdier, for "High-Speed Radial Tire", issued Sept. 11, 1973, that there has been recognized the importance of having a tread reinforcement which respects the natural equilibrium profile assumed by the carcass in the absence of a tread. The object of the arrangement described in that patent is to remedy the unfavorable state of stresses between the carcass reinforcement and the tread reinforcement. For this reason, this patent provides that the carcass assumes its own equilibrium profile only in the region of the side walls, or, otherwise stated, in a region in which the carcass is removed from the stiffening action both of the beads and of the tread reinforcement. In order to arrive at this result, the tread reinforcement contains especially stiffened edges. With regard to the reinforcements of the beads, they impose upon the carcass reinforcement, starting from the radius where the latter is subject to their influence, a substantially linear profile or even a profile curved in the direction opposite the curvature in the side walls, that is to say a point of inflection followed by a curving in the same direction as the edges of the rim.

Such an arrangement was an important advance in the art of tire manufacture but is insufficient when the diameter of such tires is greatly decreased without decreasing the standardized diameter and width of the rims on which they are to be mounted. Therefore, the height H on the rim, that is to say the difference between the outer diameter of the carcass reinforcement and the diameter thereof at the level of the bead, is relatively small as compared with the greatest axial width B of the carcass reinforcement, so that the aspect ratio H/B is frequently less than 0.6. Under these circumstances, and particularly when using a tread reinforcement which has a width either close to that of the rim or greater than it, the length of the cords or cables of the carcass reinforcement connecting the beads to the tread reinforcement and passing through the front and rear ends of the tire footprint or area of contact of the tire with the ground becomes insufficient. Therefore, the tread reinforcement can no longer assume its customary longitudinal length in the area of contact, and the latter is thereby shortened. This results in stress distributions and heating at the areas of the connection between the carcass reinforcement and the reinforced edges of the tread reinforcement on the one hand and the beads on the other hand, which are harmful to the life of these junction areas, particularly when the tires are traveling under higher loads and/or with inflation pressures which are lower than the rated values. Furthermore, the reduction in size imposed upon the surface of the contact area results in a certain reduction in the resistance to wear, the comfort, and the road-holding ability of the tires.

Contrary to what might be believed, the remedy for this state of affairs does not consist in deliberately increasing the length of the cords or cables of the carcass reinforcement between the upper end of the beads and the tread reinforcement. This would mean going back to the state of the art prior to the patent cited above. As a matter of fact, by doing this one would aggravate the distribution of the stresses at the level of the junctions between the carcass reinforcement, the tread reinforcement and the beads.

SUMMARY OF THE INVENTION

An object of the invention is to remedy the problems of prior-art tires noted above and, in particular, to provide a pneumatic tire of reduced weight having improved wear, comfort and road-holding properties.

The foregoing and other objects are attained while avoiding a substantial and therefore needless, harmful and costly increase in the length of the cords or cables of the carcass reinforcement. Rather, in accordance with the invention, a special equilibrium curve is employed.

Thus the tire in accordance with the invention, provided with a carcass reinforcement formed of radial cords or cables anchored to bead rings and a tread reinforcement with reinforced edges having at least two plies of cords or cables parallel in each ply and crossed from one ply to the other at a slight angle with respect to the circumferential direction of the tire, the ratio H/B of the height H on the rim to the largest axial width B of the carcass reinforcement of the tire being at most equal to 0.6, is characterized in that, when the tire is mounted on a normal rim and inflated, the carcass reinforcement, seen in meridian section, follows its natural equilibrium profile (as defined above) between the zone of contact of the side walls with the tread reinforcement and the zone of contact with the bead ring, such profile being tangent to the bead ring and the bead ring itself having reinforced torsional rigidity.

A bead ring having reinforced torsional rigidity assures a seating of the beads on the rim seats which is both satisfactory and indispensable. As a matter of fact, in accordance with the invention, the freedom given the cords or cables of the carcass reinforcement is taken advantage of by having recourse, merely by way of additional contribution, to the stiffening properties of the folded-back portions or to additional plies of the carcass reinforcement in order to assist in maintaining the natural equilibrium profile of the carcass reinforcement in the zone where such folded-back portions or additional plies are located. As bead wires of reinforced torsional rigidity, use can be made of bead rings of the package type having a cross-section with an axial dimension greater than its radial dimension. Another type of bead ring which advantageously combines the strength of bead rings of the cabled type with the stiffness of a triangulated structure is that described in U.S. Pat. No. 3,736,974 to Daniel Lejeune for "Tire Having Bead Wires Tangent to One Another," issued June 5, 1973.

The tread reinforcement of the tire in accordance with the invention preferably has a width substantially equal to the width of the rim on which the tire is intended to be mounted, such width for instance being a standardized width.

The invention is particularly effective when the tread reinforcement having reinforced edges has a meridian curvature which is equal to or less than its curvature in the longitudinal direction.

Not only does the present invention remedy the drawbacks indicated above but it unexpectedly makes it possible to increase the resistance to wear and the decrease by at least 10% the inflation pressure as compared with the nominal pressure recommended for such tires. This results in an additional increase in comfort, adherence, and holding to the road.

The contour of the neutral fiber of the carcass reinforcement in accordance with the invention is easily determined by means of equation (1) already set forth, namely:

$$\cos \phi = (R^2 - R_e^2)/(R_s^2 - R_e^2)$$

In practice, after having selected the corresponding characteristics of the tread reinforcement, of the rim and of the bead ring, the latter is positioned with respect to the rim. The radius $R_t$ of the point of tangency between the carcass reinforcement and the bead ring is then selected. The angle $\phi_t$ is the angle between the tangent at this point and a line parallel to the axis of the tire.

In the case of a carcass reinforcement comprising a plurality of superimposed plies, the invention applies by convention to the equilibrium figure of the neutral fiber of the reinforcement.

The length of the carcass between the zone of contact with the tread reinforcement, of radius $R_a$, and the zone of contact with the bead ring, of radius $R_t$, can be calculated by means of the equation $$\Sigma = \int_{R_t}^{R_a} \frac{(R_s^2 - R_e^2) \, dR}{\sqrt{(R_s^2 R_e^2)^2 - (R^2 - R_e^2)^2}} \quad (2)$$

BRIEF DESCRIPTION OF THE DRAWING

A better understanding of the invention can be gained from a consideration of the following detailed description of the preferred embodiments thereof, in conjuction with the appended drawing, wherein the sole FIGURE shows a radial half section through a tire in accordance with the invention.

DESCRIPTION OF THE PREFERRED EMBODIMENTS

The FIGURE shows a tire having a tread reinforcement 1, a carcass reinforcement 2, and a bead ring 3 and is arranged on a rim 8 (shown in part); it is of the tubeless type, though it could just as well be of the type having an inner tube.

The tread reinforcement 1 is arranged below the rubber tread 15 and comprises four plies 4, 5, 6, 7 of cords, preferably of steel. The edges 41 of the ply 4 are folded back over the ply 5, which considerably stiffens the edge zones of the tread reinforcement 1. Between the folded back edges 41 of the ply 4 the narrow ply 6 is arranged. The ply 7 occupies the position farthest away from the axis of the tire (not shown) and covers all the plies 4, 5, and 6. Its purpose is to protect the plies 4, 5, and 6 from cuts. For this purpose, it may be reinforced by means of cords, for instance of polyamide or elastic cables of steel. It can also be seen that in this preferred embodiment the tread reinforcement has a relatively slight curvature in the transverse direction and is applied over practically its entire width L against the carcass reinforcement 2. The width L is approximately equal to the width J of the rim.

The carcass reinforcement 2 is formed of a single ply 10 of steel cables with a relatively short portion 11 folded back around the bead ring 3. In accordance with the invention, the carcass reinforcement 2 is tangent to the bead ring 3 on the inside of the tire. The profile of the carcass reinforcement 2 in accordance with the invention or of the neutral fiber which takes the place thereof differs substantially from the profile 16 of the carcass reinforcement (shown in dotted line) which corresponds to the prior art cited above, in view of the fact that the profile of the carcass reinforcement 2 is in accord with the natural equilibrium profile from the zone of contact with the tread reinforcement of radius $R_a$ to the zone of contact with the bead ring of radius $R_t$, when the tire is mounted on the rim and inflated.

The bead ring 3 is a composite bead ring of the triangulated type described above, greatly stiffened against torsion, and comprises three unit beads rings 31, 32, 33, each unit bead ring being at the same time tangent to the other two. On the outside of the carcass reinforcement 2, the bead 12 comprises a ply 13 of cables or cords which are slightly inclined to the circumferential direction so as to reinforce the outer trim rubber 14 protecting the bead 12 from the pressures of the edge 83 of the rim 8, without however reducing the flexibility of that region of the tire.

The rim 8 is of the standard conventional type. It has the customary drop-center base 81 for the mounting of tubeless tires and a bead seat 82 inclined 15° and terminated by a curved edge 83.

For example, for a tire of size 11/50–22.5, the width L of the tread reinforcement can be selected to be 210 mm, the width J of the rim, determined in accordance with the standards, to be 210 mm,, corresponding to a radius of 285 mm; the radius $R_t$ at the point where the carcass reinforcement 2 is tangent to the composite bead ring 3 to be 300 mm; the largest width B of the carcass to be 268 mm; and the corresponding radius $R_e$ to be 358 mm. The carcass reinforcement is given a radius $R_s$ of 411 mm. From the numerical values indicated, there is derived the value of the angle $\phi_t$ formed by a line parallel to the axis of the tire and a line parallel to the carcass reinforcement 2 at the point of tangency of the carcass reinforcement 2 with the bead ring 3; this value is equal to 18°. Furthermore, in this example the value of the ratio H/B is equal to 0.47.

Compared with a control tire corresponding to the prior art discussed above, the above tire has a weight per ton transported equal to 13.2 kg while for the control tire this weight is equal to 14.8 kg, namely 11% more.

Thus there is provided in accordance with the invention a novel and highly-effective tire of reduced weight and improved properties. Many modifications of the preferred embodiments described above will readily occur to those skilled in the art upon consideration of this disclosure. Accordingly, the invention is to be construed as including all of the embodiments which are within the scope of the appended claims and their equivalents.

I claim:

1. A pneumatic tire comprising a tread, a pair of side walls respectively extending inwardly from the edges of the tread, a pair of beads respectively at the inner edges of the side walls, a pair of bead rings respectively reinforcing said beads, a carcass reinforcement formed of radial cords anchored to the bead rings, a tread reinforcement formed with reinforced edges and comprising at least two plies of cords parallel in each ply and crossed from one ply to the other at a slight angle with respect to the circumferential direction of the tire, the aspect ratio H/B of the height H on the rim to the largest axial width B of the carcass reinforcement being at most equal to 0.6, characterized in that, when the tire is mounted on a rim and inflated, the rim being of standard diameter and the rim width being substantially equal to the width of the tread reinforcement, then the carcass reinforcement, seen in meridian section, follows its natural equilibrium profile between the zone of contact of the side walls with the tread reinforcement and the zone of contact of the side walls with the respective bead rings, said profile meeting the bead rings in tangent relation and the bead rings themselves comprising three members, each of said members being tangent to two others of said members, the bead rings thus having a reinforced torsional rigidity.

2. A pneumatic tire according to claim 1, characterized in that the tread reinforcement has a meridian curvature at most equal to its curvature in the longitudinal direction.

3. A pneumatic tire according to claim 1, characterized in that, between the zone of contact of the carcass reinforcement with the tread reinforcement on the one hand and the zone of contact of the carcass reinforcement with the bead rings on the other hand, the equilibrium profile of the carcass is defined by the equation $$\cos \phi = (R^2 - R_e^2)/(R_s^2 - R_e^2)$$

where $\phi$ is the angle formed by (1) the tangent to the equilibrium profile and (2) the axis of rotation of the tire, the tangent being at a radius R from said axis; $R_e$ is the radius of the equilibrium profile corresponding to the maximum axial width reached in the side walls by this profile; and $R_s$ is the radius of the point of the tread farthest from the axis of rotation.

4. A pneumatic tire according to claim 1, characterized in that the common tangent to the carcass reinforcement and at least one bead ring forms, with the axis of the tire, an angle $\phi_t$ which satisfies the condition $$\cos \phi_t = (R_t^2 - R_e^2)/(R_s^2 - R_e^2)$$

where $R_t$ is the radius of the zone of contact of the carcass with the bead ring; $R_e$ is the radius of the equilibrium profile corresponding to the maximum axial width reached in the side walls by this profile; and $R_s$ is the radius of the point of the tread farthest from the axis of rotation.

5. A pneumatic tire according to claim 1, characterized in that the length $\Sigma$ of the carcass between the zone of contact thereof with the tread reinforcement, of radius $R_a$, and the zone of contact of the latter with the least one bead ring, of radius $R_t$, satisfies the equation $$\Sigma = \int_{R_t}^{R_a} \frac{(R_s^2 - R_e^2) \, dR}{\sqrt{(R_s^2 - R_e^2)^2 - (R^2 - R_e^2)^2}}$$

where $R_e$ is the radius of the equilibrium profile corresponding to the maximum axial width reached in the side walls by this profile; $R_s$ is the radius of the point of the tread farthest from the axis of rotation; and R is the radius of the equilibrium profile at any point between $R_t$ and $R_a$.

* * * * *

UNITED STATES PATENT AND TRADEMARK OFFICE
CERTIFICATE OF CORRECTION

PATENT NO. : 4,076,066
DATED : February 28, 1978
INVENTOR(S) : Henri Verdier

It is certified that error appears in the above-identified patent and that said Letters Patent are hereby corrected as shown below:

Col. 3, lines 35--36, "the decrease" should read -- to decrease --; Col. 3, line 66, "$(R_s^2 R_e^2)^2 - (R^2 - R_e^2)^2$" should read -- $(R_s^2 - R_e^2)^2 - (R^2 - R_e^2)^2$ --; Col. 4, lines 5--6, "conjuction" should read -- conjunction --; Col. 4, line 51, "beads" should read -- bead --; Col. 6, line 14, "$\cos \phi = (R^2 = R_e^2)/(R_s^2 = R_e^2)$" should read -- $\cos \phi = (R^2 - R_e^2)/(R_s^2 - R_e^2)$ --; and Col. 6, line 37, "with the" should read -- with at --.

Signed and Sealed this

Twentieth Day of June 1978

[SEAL]

Attest:

RUTH C. MASON
Attesting Officer

DONALD W. BANNER
Commissioner of Patents and Trademarks